US008814095B2

(12) United States Patent  
Neumann et al.

(10) Patent No.: US 8,814,095 B2
(45) Date of Patent: Aug. 26, 2014

(54) CEILING PANEL HAVING CURTAIN RAIL IN A TRANSPORT CABIN

(75) Inventors: Andreas Neumann, Wakendorf (DE); Anja Zubel-Kesoglou, Hamburg (DE); Adam Walker, Daphne (AL)

(73) Assignees: Airbus Operations GmbH, Hamburg (DE); Airbus Americas Engineering, Inc., Mobile, AL (US)

( * ) Notice: Subject to any disclaimer, the term of this patent is extended or adjusted under 35 U.S.C. 154(b) by 83 days.

(21) Appl. No.: 13/230,397

(22) Filed: Sep. 12, 2011

(65) Prior Publication Data

US 2012/0234976 A1 Sep. 20, 2012

Related U.S. Application Data

(63) Continuation of application No. PCT/EP2010/052678, filed on Mar. 3, 2010.

(60) Provisional application No. 61/159,646, filed on Mar. 12, 2009.

(30) Foreign Application Priority Data

Mar. 12, 2009 (DE) .......................... 10 2009 012 754

(51) Int. Cl.
*B64C 1/06* (2006.01)

(52) U.S. Cl.
USPC .......................................................... 244/131

(58) Field of Classification Search
USPC ............................................. 244/131, 118.5
See application file for complete search history.

(56) References Cited

U.S. PATENT DOCUMENTS

| 2,294,295 | A | * | 8/1942 | Hankins et al. ................. 160/92 |
| 2,310,573 | A |   | 2/1943 | Burton et al. |
| 2,605,064 | A | * | 7/1952 | Davis ............................. 410/104 |
| 2,658,759 | A | * | 11/1953 | Flory ............................. 273/370 |
| 2,710,731 | A | * | 6/1955 | Bright et al. ................ 244/118.6 |
| 4,088,322 | A | * | 5/1978 | Nikoden, Jr. .................. 273/406 |
| 4,102,381 | A | * | 7/1978 | Bratschi ................. 160/168.1 R |
| 4,639,031 | A |   | 1/1987 | Truckenbrodt |
| 5,393,013 | A |   | 2/1995 | Schneider et al. |

(Continued)

FOREIGN PATENT DOCUMENTS

DE 4119623 C1 10/1992
DE 9410286 U1 8/1994

(Continued)

OTHER PUBLICATIONS

German Office Action dated Jul. 20, 2010 for German Application No. 102009012754.2.

(Continued)

*Primary Examiner* — Tien Dinh
*Assistant Examiner* — Justin Benedik
(74) *Attorney, Agent, or Firm* — Ingrassia Fisher & Lorenze, P.C.

(57) ABSTRACT

A ceiling panel is configured for attaching a curtain in a cabin of a transportation device with an attachment unit, a mounting unit, and a curtain attachment unit. The ceiling panel is configured to integrate the attachment unit, the attachment unit is configured to attach the mounting unit to the ceiling panel, the mounting unit is configured to attach the curtain attachment unit, and the curtain attachment unit is configured to support the curtain.

9 Claims, 4 Drawing Sheets

(56) References Cited

U.S. PATENT DOCUMENTS

| | | | |
|---|---|---|---|
| 5,816,534 A | 10/1998 | Schumacher | |
| 6,189,831 B1 * | 2/2001 | Asai et al. | 244/118.5 |
| 6,523,779 B1 | 2/2003 | Michel | |

FOREIGN PATENT DOCUMENTS

| | | |
|---|---|---|
| DE | 102006043495 A1 | 4/2007 |
| DE | 202007013134 U1 | 11/2007 |
| EP | 0547362 A1 | 6/1993 |
| EP | 0754621 A1 | 1/1997 |

OTHER PUBLICATIONS

International Search Report for International Application No. PCT/EP2010/052678 dated Jun. 7, 2010.

International Preliminary Report on Patentability dated Sep. 20, 2011 for International Application No. PCT/EP2010/052678.

* cited by examiner

1

CEILING PANEL HAVING CURTAIN RAIL IN A TRANSPORT CABIN

CROSS-REFERENCE TO RELATED APPLICATIONS

This is a continuation of International Application No. PCT/EP2010/052678, filed Mar. 3, 2010, which application claims priority to U.S. Provisional Application No. 61/159, 646, filed Mar. 12, 2009 and to German Patent Application No. 10 2009 012 754.2, filed Mar. 12, 2009, which are both hereby incorporated in their entirety by reference.

TECHNICAL FIELD

The technical field relates to the partitioning of areas in a transportation device. In particular, the technical field relates to a ceiling panel with a device for attaching a curtain in a cabin of a transportation device. The technical field further relates to an aircraft with an aisle and a ceiling panel, as well as to a method of attaching a curtain in a cabin of a transportation device, and to the use of a ceiling panel in an aircraft.

BACKGROUND

Curtain rails are used in aircraft cabins to separate classes from each other, or to separate working areas in onboard kitchens from the passengers. Thereby the curtain rail is a simple rail on which a curtain slides.

Known from EP 0 547 362 A1 is a device for partitioning an aircraft cabin with a carrier for mounting a curtain. DE 41 19 623 C1 shows a device for partitioning an aircraft cabin into two groups of seats with at least one separating element, which has a curtain.

In view of the foregoing, it is at least one object to provide a simple and flexible device for partitioning areas in a transportation device. In addition, other objects, desirable features, and characteristics will become apparent from the subsequent summary and detailed description and the appended claims, taken in conjunction with the accompanying drawings and this background.

SUMMARY

The at least one object, other objects, desirable features, and characteristics of the invention may be met by a ceiling panel with a device for attaching a curtain in a cabin of a transportation device, an aircraft with an aisle and a ceiling panel, a method of attaching a curtain in a cabin of a transportation device, and the use of a ceiling panel in an aircraft.

According to an exemplary embodiment a ceiling panel is provided with a device for attaching a curtain in a cabin of a transportation device, with an attachment unit, a mounting unit, and a curtain attachment unit. The ceiling panel is designed to support or attach the attachment unit. To this end, the attachment unit may be at least partially integrated in the ceiling panel, for example. The attachment unit is designed to attach the mounting unit to the ceiling panel. The attachment unit may be designed as a mounting attachment unit to movably attach the mounting unit or two or more mounting units. The mounting unit is designed to support or install the curtain attachment unit, and the curtain attachment unit is designed to support a curtain. The curtain attachment unit may be designed as a curtain rail, curtain rod, etc.

Such a ceiling panel allows that, for example, in an aircraft cabin classes may be separated from each other. Furthermore, working areas in onboard kitchens may be designed to be separable from the passengers. Such a ceiling panel allows that the area extending from the floor of an aisle in an aircraft cabin to an area above the attachment unit up to the ceiling panel may be separated to provide a privacy shield, and potentially also a light shield. For example, such a ceiling panel is arranged above a central overhead storage bin of a cabin and/or above a lateral overhead bin (hat rack). The ceiling panel may be attached above a monument in an aircraft.

The ceiling panel has the advantage that many different attachment positions of the curtain attachment unit are possible in the transportation device, and that several different former attachment variants may be replaced. Thus, the ceiling panel may be provided as a standard solution for attaching a curtain in a cabin of a transportation device. Thereby, a standardized solution may be provided for example, to attach a curtain in a cabin at a reduced cost and time effort during the installation process. Such a ceiling panel may avoid a connection to overhead storage bins (hat racks), a separating wall, a monument or combinations thereof.

Such a ceiling panel allows the integration of different contours of an attachment unit in the ceiling panel. Thereby, the attachment units may run in different directions of the ceiling panel, for example also as pivoted rail guides. Such a ceiling panel may allow to reduce the effort of adjusting the curtain system to surrounding assemblies and systems with which the curtain system usually has interfaces, e.g., a ceiling, a lateral or central overhead storage bin (e.g., hat rack, central, lateral, etc.), lighting units (e.g., ballast unit, etc.), substructures, air conditioners and electrical equipment (i.e., many interfaces). The above mentioned effort of adjustment is only required once during repeated installations of the ceiling panel, since the ceiling panel may be standardized, so that each ceiling panel (with or without attachment unit) may be easily installed into a transportation device. As a result, the connections of the ceiling panel, and the ceiling panel, respectively, do not have to be reconstructed completely after the adjustment process, for example.

The ceiling panel allows that the attachment unit is designed sparsely exposed and adjusted to the installation space, for example an aircraft cabin, that a light tightness relative to the ceiling may be achieved, and that wide sealings for covering light, as well as many sealing variants are not required any more. For example, such a ceiling panel may be reused in another transportation device. Such a ceiling panel for attaching a curtain is reconfigurable. Reconfigurable device that a ceiling panel with a curtain mounting option may be exchanged when required with a ceiling panel without this mounting with little effort. This might become necessary when reconfiguring the cabin layout, e.g., expanding business class and reducing economy class and vice versa. If this layout change is very small, the ceiling panel may remain at its position, and the classes are moved (reconfigured) within the panel by moving the curtain rail.

Furthermore, this ceiling panel allows a quick and time-saving installation of an attachment unit in a cabin of a transportation device as well as a quick exchange of an already installed ceiling panel without an attachment unit by a ceiling panel having an attachment unit. Further, such a ceiling panel may further allow that various progressions of the curtain attachment device do not require that the connection of the attachment unit be reconstructed.

Such a ceiling panel allows the curtain attachment unit to be easily moved within the ceiling panel, for example through fine adjustments, for example for reconfiguration (see above explanation of reconfiguration). For example, the curtain attachment unit may thereby be attached pivoted to the ceiling panel. For example, such a ceiling panel allows the exchange of the entire ceiling panel by a "standard ceiling panel" if the curtain attachment unit moves by more than one ceiling panel, giving the ceiling panel a reconfigurable design. For example, such a ceiling panel allows that positioning errors during installation/planning may be easily corrected, and that a reconstruction of the curtain attachment unit and the attachment unit is not required anymore.

Such a ceiling panel allows that the ceiling panel and/or curtain may be designed between for example a central overhead storage bin (hat rack central) and lateral overhead storage bin (e.g., hat rack, lateral, etc.) in a cabin, or may be designed over a lateral overhead storage bin (e.g., hat rack, lateral, lateral, etc.) in a cabin without a central overhead storage bin (e.g., hat rack, central, etc.), or may be designed over an aircraft monument in a cabin without a central overhead storage bin and without a lateral overhead storage bin, or may be designed between a central overhead storage bin (i.e., hat rack, central, etc.) and a lateral monument of a cabin, or may be designed for example between a lateral overhead storage bin (e.g., hat rack, lateral, etc.) and a central monument, or may be designed for example between a central monument (center) and a lateral monument (lateral). For example, such a ceiling panel allows the attachment unit, the mounting unit, and the curtain attachment unit to be quickly removable and/or exchangeable for maintenance or repair purposes (quick change).

Such a ceiling panel allows that an attachment unit and/or mounting unit do/does not have to be adjusted, for example when a different curtain position is desired, but rather that for example only the curtain attachment unit for supporting the curtain has to be adjusted. Such a ceiling panel allows that the ceiling panel may be designed as a standard ceiling panel, and that thus during the installation of the ceiling little time and cost efforts incur, for example during series production.

According to another exemplary embodiment, two or more mounting units may be provided, which are attached to the, or several attachment unit(s) integrated in the ceiling panel. For example, the attachment units are arranged parallel to each other. According to another exemplary embodiment, the attachment unit is designed as a rail.

According to another exemplary embodiment, the ceiling panel has a sealing unit. The sealing unit is designed to be punched through the mounting unit. The sealing unit is designed to cover the attachment unit. The sealing unit is designed to be integrated in the attachment unit.

Such a ceiling panel with a sealing unit allows that the attachment unit, which may be designed as a longitudinal rail, for example with two seals each, such as brush seals, silicone seals, etc., through which the mounting units punch through, may be covered or that the sealing units may be completely integrated in the attachment unit, so that only the openings of the attachment units exemplarily designed as two rails are visible in the ceiling panel.

According to another exemplary embodiment, the ceiling panel has a plug-in system. The attachment unit is designed as a profile with a defined raster for the plug-in system. The plug-in system is designed to attach the mounting unit to the attachment unit. Such a ceiling panel with plug-in system allows the attachment unit to be designed as a profile with a defined raster for the plug-in system.

According to another exemplary embodiment, the plug-in system is designed as a snap-and-click plug-in system ("snap-and-click" system), as screw attachment system. The screw may be locked by a quarter turn for example, or as a bolt with extensible pins or balls. According to another exemplary embodiment, the plug-in system is designed as a spring system with engaging elements. The curtain attachment unit is designed to engage via a mounting unit designed as a spring by device of pins in recesses of the attachment unit which is attached to the ceiling panel as a U-shaped carrier, for example.

According to another exemplary embodiment, the ceiling panel is designed to integrate the attachment unit in a longitudinal direction of the ceiling panel. In other words, this device that the attachment unit may be integrated in a longitudinal direction of the ceiling panel.

According to another exemplary embodiment, the mounting unit is designed to attach the curtain attachment unit in a transverse direction to a longitudinal direction of the ceiling panel. In other words, the curtain attachment unit may be attached to the mounting unit or mounting units transverse to an aisle in an aircraft, for example.

According to another exemplary embodiment, the attachment unit is designed to movably attach the mounting unit. This device that the curtain attachment unit and mounting unit may be moved in a longitudinal direction of the ceiling panel. According to another exemplary embodiment of the invention, the mounting unit is designed to be clamped at a specific position to the attachment unit in the ceiling panel. According to another exemplary embodiment, the ceiling panel is designed to be connected to a passenger cabin of an aircraft between two overhead storage bins.

According to another exemplary embodiment of the invention an aircraft with an aisle and a ceiling panel is provided according to one of the preceding exemplary embodiments. The ceiling panel is installed over the aisle. In such an aircraft with an aisle, the ceiling panel may be flexibly installed in the ceiling area of the aircraft, thereby enabling a separation of different cabin areas inside the aircraft.

According to another exemplary embodiment a method of attaching a curtain in a cabin of a transportation device is provided, with a first step of integrating an attachment unit in a ceiling panel, a second step of attaching a mounting unit to the attachment unit, a third step of attaching the curtain attachment unit to the mounting unit, and a last step of attaching the curtain to the curtain attachment unit. According to another exemplary embodiment, the method further comprises covering the attachment unit with a sealing unit after integrating the attachment unit in the ceiling panel, as well as punching the sealing unit through a mounting unit while attaching the mounting unit to the attachment unit.

According to another exemplary embodiment the use of a ceiling panel according to one of the preceding exemplary embodiments in an aircraft is provided.

The individual features of the various exemplary embodiments may also be combined with each other, as a result of which, in part, advantageous effects may arise which go beyond the sum of the individual effects, even if these are not explicitly described. In particular, it should be noted that the features described herein and in the following in relation to the ceiling panel may also be implemented in the transportation device and the method, and vice versa. These and other aspects will become apparent from and elucidated with reference to the exemplary embodiments described hereafter.

BRIEF DESCRIPTION OF THE DRAWINGS

The present invention will hereinafter be described in conjunction with the following drawing figures, wherein like numerals denote like elements, and the illustrations in the figures are schematic, and not to scale, and.

DETAILED DESCRIPTION

The following detailed description is merely exemplary in nature and is not intended to limit application and uses. Furthermore, there is no intention to be bound by any theory presented in the preceding summary and background or the following detailed description.

Figure 1:
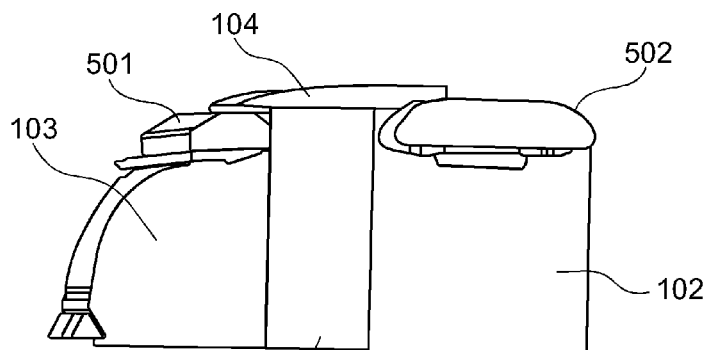
FIG. 1 shows a view in perspective of part of an aircraft cabin with a curtain rail and a curtain.

FIG. 1 shows a view in perspective of part of an aircraft cabin with a central overhead storage bin 502 and a lateral overhead storage bin 501, to which a curtain rail 104 is attached. A curtain 101 is attached to the curtain rail 104, which curtain 101 is designed to separate individual areas, for example of an aircraft cabin. A central compartment is located under the central overhead storage bin, while a lateral compartment is located under the lateral overhead storage bin.

Figure 2A:
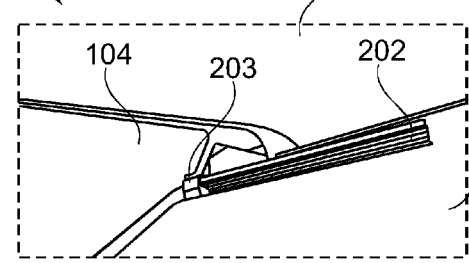
FIG. 2a shows a view in perspective of a curtain rail, which is attached to a central overhead storage bin in a cabin of an aircraft.

FIG. 2a shows a view in perspective of part of a cabin 200 of an aircraft with a ceiling area 201, at which a curtain rail 104 is arranged, which is attached to an attachment unit 202 by way of a mounting unit 203, wherein the attachment unit 202 is attached in a lateral overhead storage bin 501.

Figure 2B:
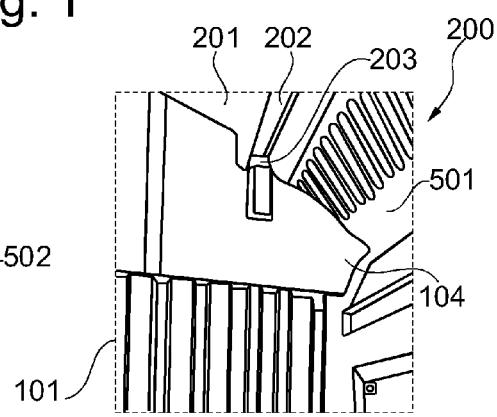
FIG. 2b shows a view in perspective of a curtain rail with a curtain in an aircraft cabin that is arranged at a lateral ceiling area of an aircraft.

FIG. 2b shows a view in perspective of part of a cabin 200 of an aircraft with a curtain rail 104 for hanging a curtain 101. The curtain rail 104 is attached to an attachment unit 202 by way of a mounting unit 203, wherein the attachment unit 202 is integrated in a ceiling area 201 of the aircraft.

Figure 2C:
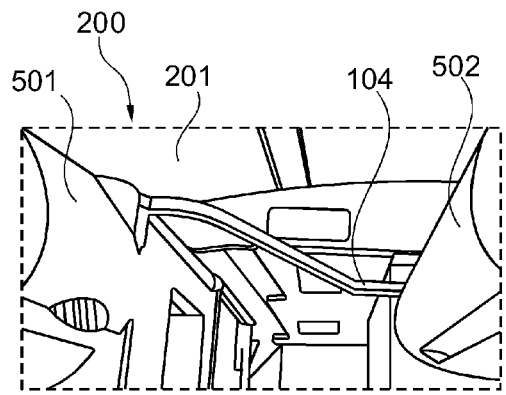
FIG. 2c shows a view in perspective of a curtain rail arranged between a central overhead storage bin and a lateral overhead storage bin in an aircraft cabin.

FIG. 2c shows a view in perspective from below of an aisle of a cabin 200 of an aircraft with a ceiling area 201 as well as a central overhead storage bin 502 and a lateral overhead bin 501. A curtain rail 104 for hanging a curtain is thereby doubly bent and pivoted at the central overhead storage bin 502 and at the lateral overhead storage bin 501.

Figure 2D:
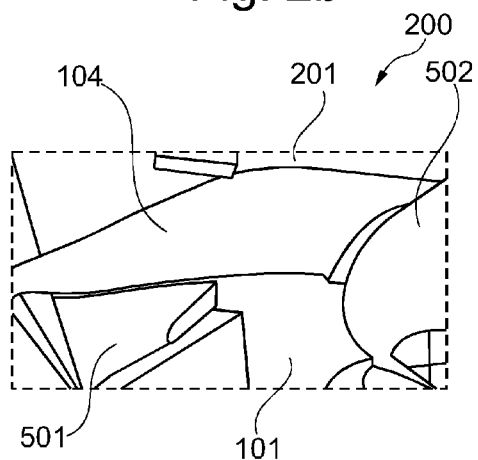
FIG. 2d shows a curtain rail attached to a central overhead storage bin and to a lateral overhead storage bin in an aircraft cabin, with a curtain.

FIG. 2d shows a schematic illustration of a section of a cabin 200 of an aircraft with a ceiling area 201 as well as a central overhead storage bin 502 and a lateral overhead storage bin 501. A curtain rail 104 is attached to the central overhead storage bin 502 as well as to the lateral overhead storage bin 501 and to the ceiling area 201. A curtain 101 is attached to the curtain rail 104 to separate areas in the aircraft cabin.

Figure 3:
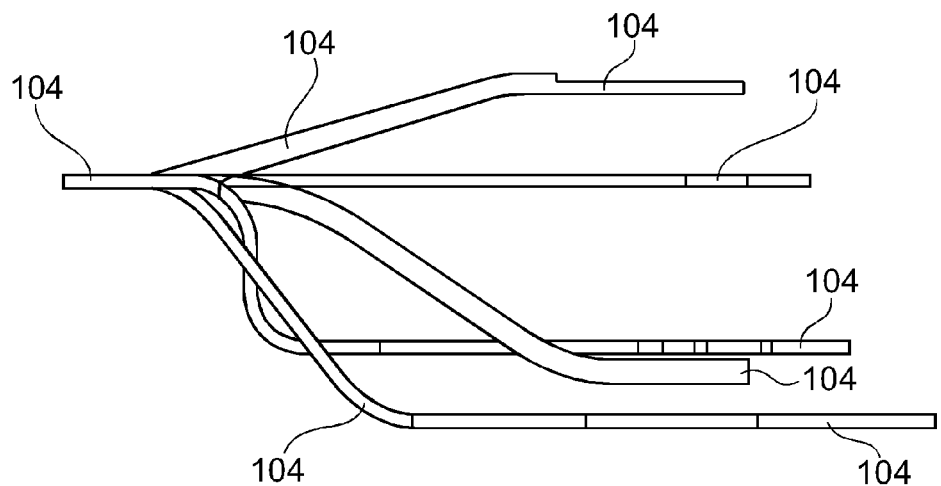
FIG. 3 shows a top view of several curtain rail configurations for attaching a curtain for an aircraft.

FIG. 3 shows different configurations of various curtain rails 104 for aircraft cabins for hanging curtains 101 so as to separate areas in aircraft cabins from each other.

Figure 4A:
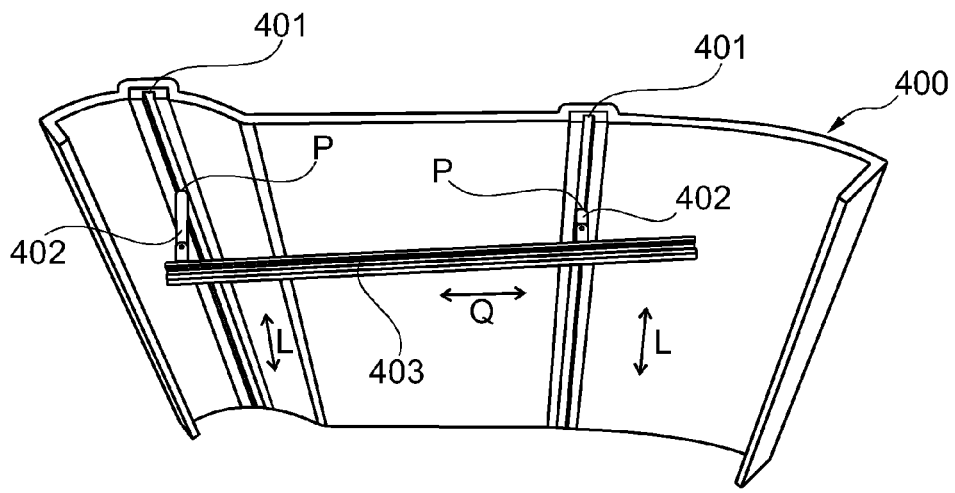
FIG. 4a shows a bottom view in perspective of a ceiling panel for attaching a curtain in a cabin of a transportation device according to an exemplary embodiment.

FIG. 4a shows a ceiling panel 400 for attaching a curtain 101 in a cabin of a transportation device with two attachment units 401, which are integrated in the ceiling panel 400, two mounting units 402, which are attached to the attachment units 401, and a curtain attachment unit 403 for supporting a curtain. The curtain attachment unit 403 is attached to the two mounting units 402. The attachment units 401 are thereby designed as rails 401 integrated in the ceiling panel 400 in a longitudinal direction L to the ceiling panel 400 and arranged parallel to each other. The mounting units 402 are clamped in a respective rail 401 at a specific position P, thereby enabling to lock the curtain attachment unit 403 in place. The curtain attachment unit 403 runs in a transverse direction Q relative to the longitudinal direction L of the ceiling panel.

Figure 4B:
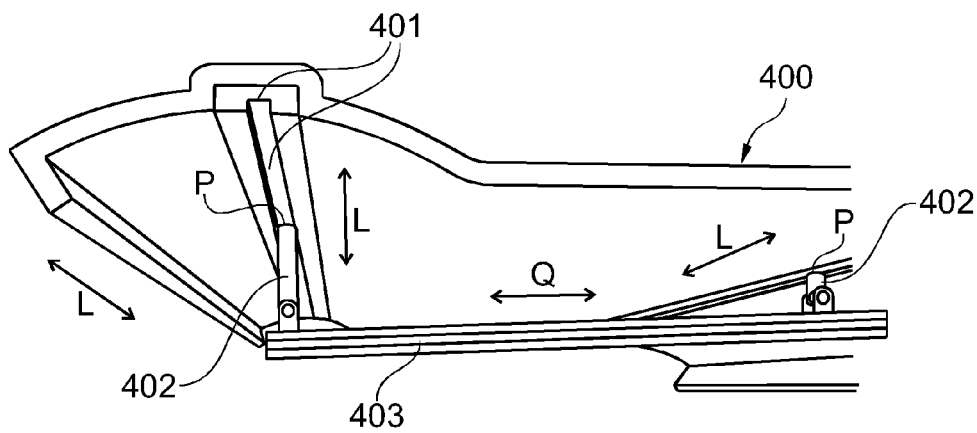
FIG. 4b shows a magnified side view in perspective of part of the ceiling panel of FIG. 4a according to an exemplary embodiment.

FIG. 4b shows a part of the ceiling panel 400 of FIG. 4a in a magnified view.

Figure 5:
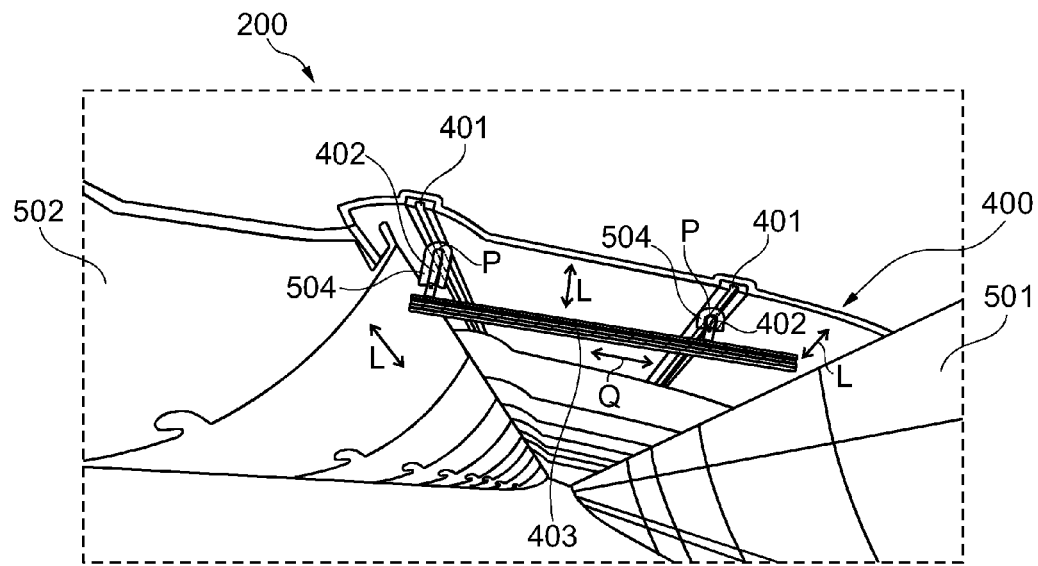
FIG. 5 shows a side view in perspective from below a cabin in an aircraft with a ceiling panel for attaching a curtain according to an exemplary embodiment.

FIG. 5 shows a cabin 200 of an aircraft in a view in perspective from below, with a lateral overhead storage bin 501 and a central overhead storage bin 502. A ceiling panel 400 is arranged between the lateral overhead storage bin 501 and the central overhead storage bin 502, and has two integrated attachment units 401 in a longitudinal direction L, which are designed as rails 401. Two mounting units 402 are attached at the two rails 401. A curtain attachment unit 403 is attached to the mounting units 402. The curtain attachment unit 403 is designed to support a curtain for separating areas of the cabin 200 of the aircraft.

FIG. 5 further shows two sealing units 504 which are designed to cover the attachment units 401 and which may integrate attachment units 401. The two mounting units 402 punch-through the sealing units 504.

The two rails 401 thereby run in a longitudinal direction of the ceiling panel 400, while the curtain attachment unit 403 runs in a transverse direction Q relative to the longitudinal direction L of the ceiling panel 400.

Figure 6A:
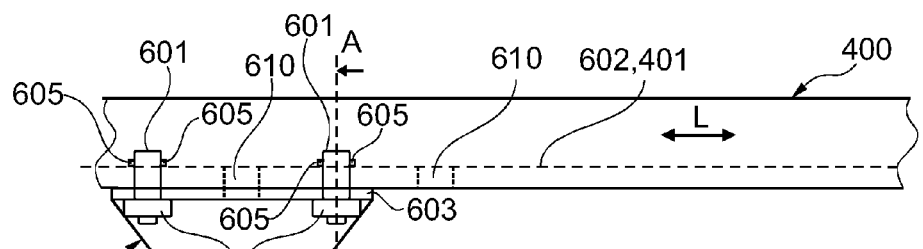
FIG. 6a shows a schematic sectional view of a ceiling panel for attaching a curtain in a cabin of a transportation device according to an exemplary embodiment.

FIG. 6a shows a ceiling panel 400 with a U-carrier (carrier with a U-profile) 602, which is integrated as an attachment unit 401 in the ceiling panel 400, and with a plug-in system 601 that has bolts 604 with latching pins 605. The bolts 604 are designed to attach a mounting unit 402 through recesses 610 of the U-carrier 602. The mounting unit 402 is designed as a U-profile 603 and attached to a curtain attachment unit 403 designed to support a curtain. The recesses 610 of the attachment unit 402 or U-carrier 602 for the plug-in system 601 run in a longitudinal direction L of the ceiling panel 400.

Figure 6B:
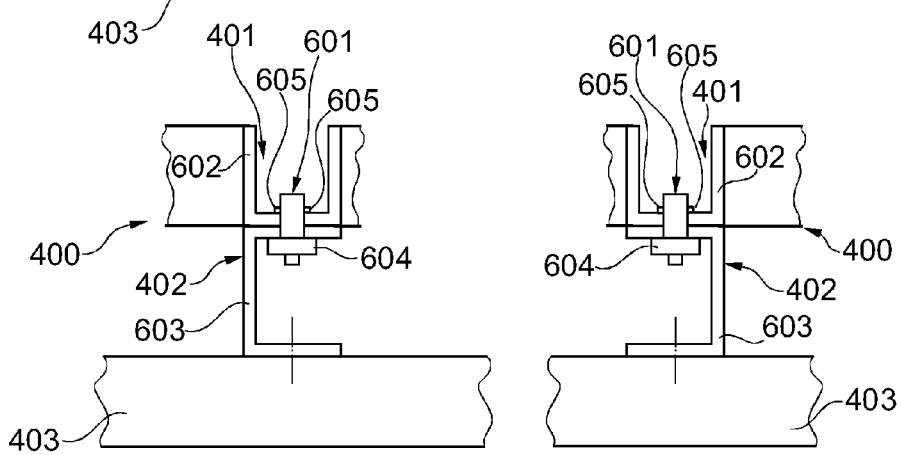
FIG. 6b shows a sectional view of the ceiling panel of FIG. 6a along the intersecting line A-A according to an exemplary embodiment.

FIG. 6b shows a sectional view of the ceiling panel of FIG. 6a along the intersecting line A-A, and has all elements of the ceiling panel 400 of FIG. 6a.

Figure 6C:
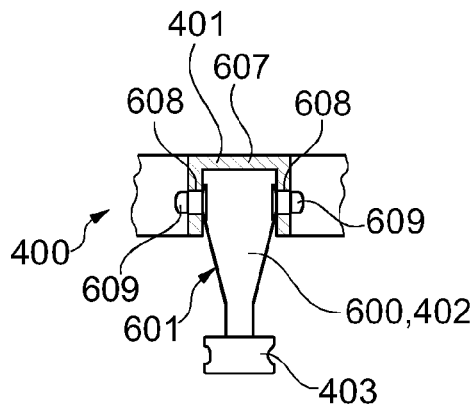
FIG. 6c shows a sectional view of part of a ceiling panel for attaching a curtain in a cabin of a transportation device according to an exemplary embodiment.

FIG. 6c shows a part of a ceiling panel 400 for attaching a curtain in a cabin of a transportation device, wherein an attachment unit 401 is designed as a U-carrier 607 integrated in the ceiling panel 400.

A mounting unit 402 designed as a spring 606 is attached to the ceiling panel 400, the spring 606 together with two latching pins 609 forming a plug-in system 601. The mounting unit 402 is attached to the attachment unit 401 by the latching pins 609, which lock in recesses 608 of the U-carrier 607. A curtain attachment unit 403 is attached to the plug-in system 601 or mounting unit 402.

Figure 7:
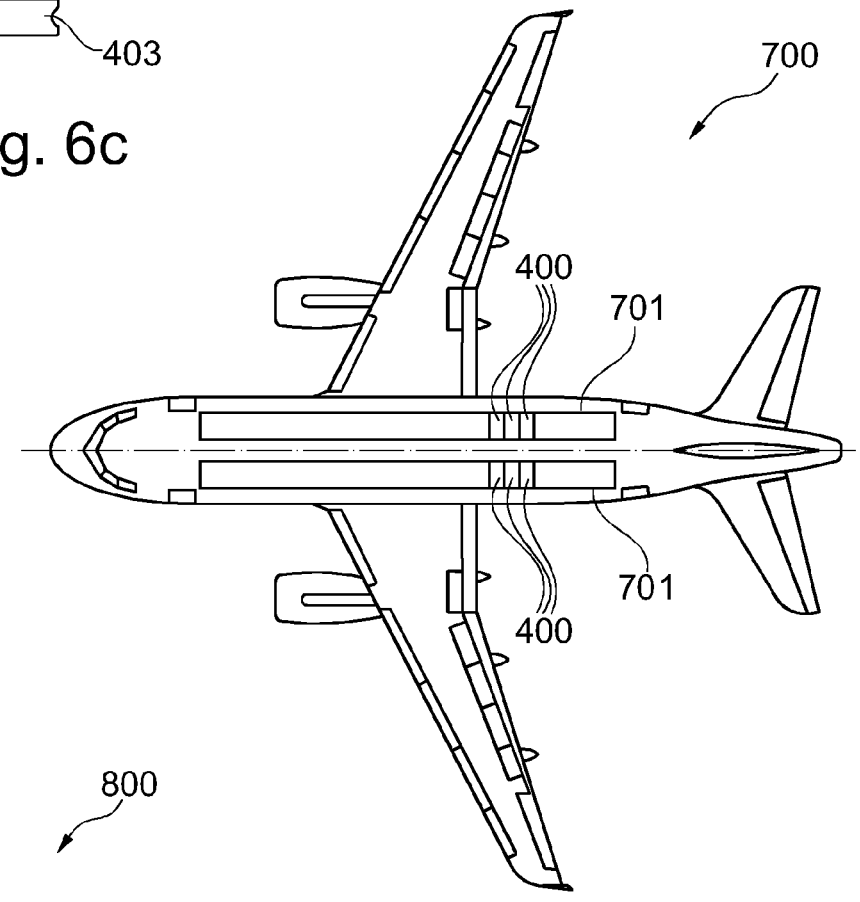
FIG. 7 shows an aircraft with two aisles and several ceiling panels for attaching a curtain in a cabin of the aircraft according to an exemplary embodiment.

FIG. 7 shows an aircraft 700 with two aisles 701 and several ceiling panels 400, wherein the ceiling panels 400 are installed over the aisle 700.

Figure 8:
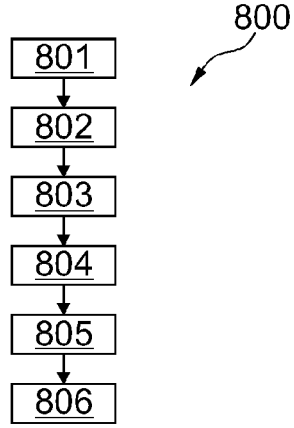
FIG. 8 shows a method for attaching a curtain in a cabin of a transportation device according to an exemplary embodiment.

FIG. 8 shows a method 800 of attaching a curtain in a cabin of a transportation device comprising the following steps: In step 801, an attachment unit is integrated in a ceiling panel. In step 802, a mounting unit is attached to the attachment unit. In step 803, the curtain attachment unit is attached to the mounting unit. In step 804, the curtain is attached to the curtain attachment unit. In step 805, the attachment unit is covered by a sealing unit after integrating the attachment unit in the ceiling panel. In the last step 806 a mounting unit punches through the sealing unit while attaching the mounting unit to an attachment unit.

Although the embodiments have been described with reference to the exemplary embodiments, various changes and modifications may be made without leaving the scope of protection. The transportation device with an aisle and a ceiling panel may be designed as a ground vehicle, an aircraft, such as an airplane or helicopter, as well as a watercraft and rail vehicle. Moreover, while at least one exemplary embodiment has been presented in the preceding summary and detailed description, it should be appreciated that a vast number of variations exist. It should also be appreciated that the exemplary embodiment or exemplary embodiments are only examples, and are not intended to limit the scope, applicability, or configuration. Rather, the foregoing summary and detailed description will provide those skilled in the art with a convenient road map for implementing an exemplary embodiment, it being understood that various changes may be made in the function and arrangement of elements and features of methods described in exemplary embodiments without departing from the scope as set forth in the appended claims and their equivalents. In addition, it should be noted that "comprising" or "having" does not exclude any other elements or steps, and that "a" or "an" does not exclude a plurality. In particular, the ceiling panel may thus have more than one attachment unit, more than one mounting unit, more than one curtain attachment unit, more than one curtain, more than one sealing unit, more than one plug-in system, and the aircraft may have more than one aisle and more than one ceiling panel. Furthermore, it should be noted that any features or steps which have been described with reference to one of the above exemplary embodiments may also be used in combination with other features or steps of other exemplary embodiments described above.

What is claimed is:

1. A device for attaching a curtain in a passenger cabin of an aircraft, comprising:
    a first attachment unit;
    a second attachment unit;
    a ceiling panel that supports the first attachment unit and the second attachment unit, and the first attachment unit and the second attachment unit are integrated in the ceiling panel, the ceiling panel attached in the passenger cabin of the aircraft between two overhead stowage bins;
    a first mounting unit movably attached to the first attachment unit;
    a second mounting unit movably attached to the second attachment unit;
    a curtain attachment unit supported by the first mounting unit and the second mounting unit, and the curtain attachment unit supports the curtain,
    wherein the first mounting unit that is movably attached to the first attachment unit is movable along a first longitudinal extension of the first attachment unit and the second mounting unit is movably attached to the second attachment unit and is movable along a second longitudinal extension of the second attachment unit.

2. The device of claim 1,
    wherein the first attachment unit is a rail.

3. The device of claim 1, further comprising a sealing unit, the sealing unit configured to:
    punch through the first mounting unit;
    cover the first attachment unit; and
    integrate in the first attachment unit.

4. The device of claim 1, further comprising a plug-in system configured to attach the first mounting unit to the first attachment unit,
    wherein the first attachment unit is a defined raster for the plug-in system.

5. The device of claim 1, wherein the first mounting unit is configured to attach the curtain attachment unit in a transverse direction to a longitudinal direction of the ceiling panel.

6. A method of attaching a curtain in a cabin of a transportation device, the method comprising:
    integrating a first attachment unit in a ceiling panel;
    integrating a second attachment unit in the ceiling panel;
    movably attaching a first mounting unit to the first attachment unit;
    movably attaching a second mounting unit to the second attachment unit;
    attaching a curtain attachment unit to the first mounting unit and the second mounting unit; and
    attaching the curtain to the curtain attachment unit,
    wherein the first mounting unit that is movably attached to the ceiling panel is movable with respect to the first attachment unit and the second mounting unit that is movably attached to the ceiling panel is movable along a second longitudinal extension of the second attachment unit.

7. The method of claim 6, further:
    covering the first attachment unit with a sealing unit after integrating the first attachment unit in the ceiling panel;
    punching the sealing unit through the first mounting unit while attaching the first mounting unit to the first attachment unit,
    wherein the ceiling panel is configured for attachment in a passenger cabin of the transportation device between two overhead storage bins, and
    wherein the transportation device is an aircraft.

8. An aircraft, comprising:
    an aisle;
    a first attachment unit;
    a second attachment unit;
    a ceiling panel installed above the aisle, the ceiling panel supports the first attachment unit and the second attachment unit, and the first attachment unit and the second attachment unit are integrated in the ceiling panel, the ceiling panel attached in a passenger cabin of the aircraft between two overhead storage bins;
    a first mounting unit movably attached to the first attachment unit;
    a second mounting unit movably attached to the second attachment unit; and a curtain attachment unit supported by the first mounting unit and the second mounting unit, and the curtain attachment unit supports a curtain, wherein the first mounting unit that is movably attached to the first attachment unit is movable along a first longitudinal extension of the first attachment unit and the second mounting unit that is movably attached to the second attachment unit is movable along a second longitudinal extension of the second attachment unit.

9. The aircraft of claim 8, wherein the ceiling panel is configured to integrate the first attachment unit in a longitudinal direction of the aircraft.

* * * * *